United States Patent [19]

Smolders

[11] Patent Number: 4,674,371
[45] Date of Patent: Jun. 23, 1987

[54] TOOL POST WITH TOOL

[75] Inventor: Cornelis Smolders, Zevenaar, Netherlands

[73] Assignee: Komeetstaal Holding B.V., Doetinchem, Netherlands

[21] Appl. No.: 817,813

[22] Filed: Jan. 10, 1986

[30] Foreign Application Priority Data

Jan. 11, 1985 [NL] Netherlands .................. 8500067

[51] Int. Cl.⁴ .............................................. B23B 29/04
[52] U.S. Cl. .................................... 82/36 R; 407/112; 408/204; 408/206; 408/703
[58] Field of Search ............... 82/36 R; 408/204, 206, 408/703, 185, 197; 407/112

[56] References Cited

U.S. PATENT DOCUMENTS

| 3,546,980 | 12/1970 | Lemanski | 408/206 |
| 4,096,613 | 6/1978 | Takacs et al. | 408/185 |
| 4,118,138 | 10/1978 | Takacs et al. | 407/112 |
| 4,247,233 | 1/1981 | Kraemer | 408/185 |
| 4,332,513 | 6/1982 | Gowanlock | 82/36 R |

Primary Examiner—Nicholas P. Godici
Assistant Examiner—Jerry Kearns
Attorney, Agent, or Firm—Olson and Olson

[57] ABSTRACT

Tool post with tool (9) for metal cutting work of a hollow space, said tool (9) being clamped between a support (3) and a clamp (12) with the support (3) attached to a carrier (1), the support (3) over its entire length as well as the clamp (12) being curved, said curvature (6,22) having a center line parallel to the longitudinal axis of the tool (9) in a plane through the cutting edge (8) of the tool (9) and inside the cutting circle of the tool, preferably carrier (1) and support (3) being designed such that support (3) and clamp (12) can be placed on either side of the carrier (1).

3 Claims, 4 Drawing Figures

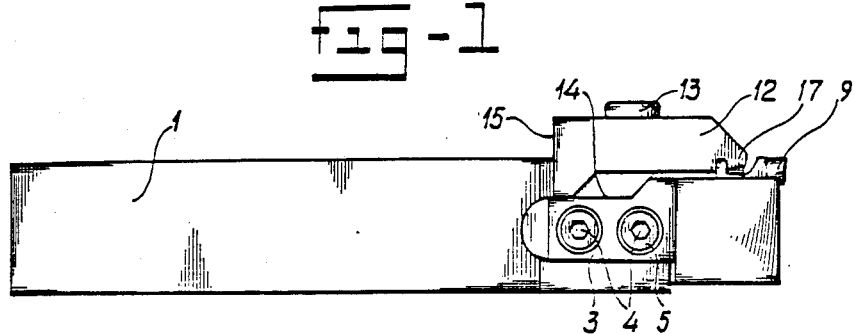
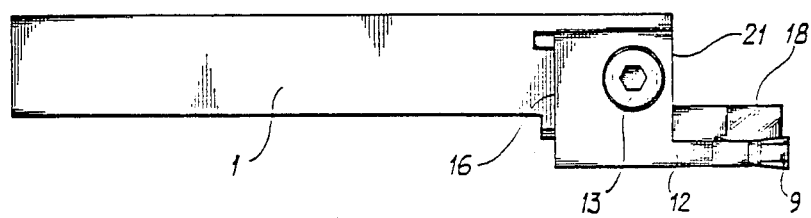
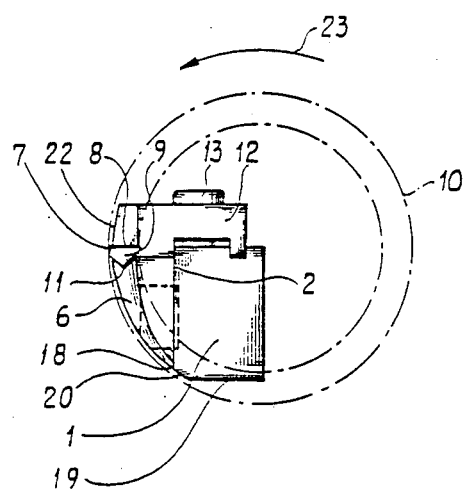
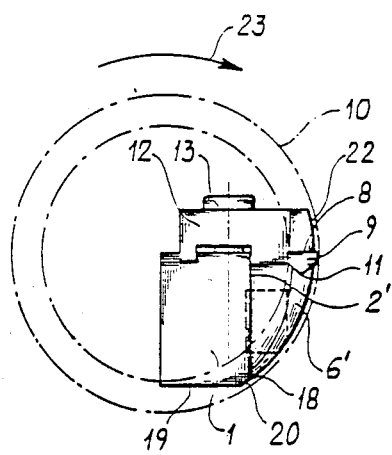

TOOL POST WITH TOOL

BACKGROUND OF THE INVENTION

The invention relates to a tool post with tool for metal-cutting work, comprising a carrier, a bottom support for the tool and a clamp which grips the top of the tool and is fastened detachably to the carrier, and a tool which can be clamped between the support and the clamp in a position precisely determined by a stop, said tool at the cutting edge projecting laterally beyond the support, and said support having over a length which is at least equal to the length of the tool a curved outside face in a curve whose centre line is parallel to the longitudinal axis of the tool and lies in a plane through the cutting edge.

Such a tool post with tool is known from U.S. Pat. No. 4,555,202 and in particular from FIGS. 7 to 9. In the case of this known tool post with tool the curve of the support relative to the carrier is outwards. This means that during insertion for the making of a cylindrical cavity or a circular groove one can never go deeper than the distance which is determined by the distance between the cutting edge and the nearest front face of the carrier or the clamp not belonging to that part of the clamp which grips the tool itself. If this distance is increased by increasing the length of the curved part of the support and the part of the clamp above it, which may also be curved, the stability of clamping of the tool is reduced, due to the fact that the parts of the support and the clamp gripping the tool have to be relatively thin, in general thinner than the width of the cutting edge of the tool.

SUMMARY OF THE INVENTION

The object of the invention is to produce in a simple manner a solution which makes it possible to increase the insertion depth while retaining a secure clamping.

This object is achieved according to the invention in that the curve extends over the entire length of the support and faces the carrier, and the clamp has a side face which forms a continuation of the outside face of the curve of the support. Since the curve faces inwards, and both the clamp and the support are curved over their entire length, insertion is possible without conflict with the front face, and therefore over a greater depth than previously.

The side face of the carrier following the support preferably lies in a vertical plane through or inwards of the bottom edge of the curved outside face of the support with the under side of the carrier within the continuation of the curve of the outside face of the support. This means that the carrier also does not have parts which could come into conflict with the workpiece, so that insertion can also take place over a part of the length of the carrier.

From U.S. Pat. No. 4,555,202 it is known to fasten the support against a side face of the carrier and to fix the clamp on the top face of the carrier. With the use of the inward-facing curve according to the invention, this already results in lateral placing of the curved outside faces of support and clamp, in such a way relative to the adjacent side face of the carrier that, if this also satisfies the condition that the under side of the carrier comes within the continuation of the curve of the outside faces of support or clamp, the insertion can take place in a simple manner to a greater depth than the axial length of support or clamp. According to the invention, it is now advantageous for the carrier to be designed in such a way that the support can be attached both against the left and against the right side, and both the support and the clamp for placing left of the carrier have a curvature of their respective side faces which is the reverse of the curvature of these side faces of the support and clamp intended for placing to the right of the carrier. With one carrier and two sets of clamp and support belonging together, it is now possible to machine with the same tool both during rotation of the workpiece clockwise and during rotation anticlockwise.

A preferred embodiment of the invention will now be explained in greater detail with reference to the drawings.

BRIEF DESCRIPTION OF THE DRAWINGS

FIG. 1 shows a side view of a tool holder with tool according to the invention.

FIG. 2 is a top view of FIG. 1, and

FIG. 3 is a front view of FIG. 1.

FIG. 4 shows the application of the invention on changing of the direction of rotation, with carrier, support and clamp, in a front view.

DESCRIPTION OF THE PREFERRED EMBODIMENT

The figure shows a carrier 1, against the right side of which—which is indicated by 2, and which forms the right side when one looks in the direction of the tool—a support 3 is fastened with bolts 4 and 5, said support having a curved outside face 6, which is located on the inside of the outside edge 7 of the cutting edge 8 of the tool 9 and thus falls within the circle 10 which is described by the outside edge 7. This curved part 6 has a V-shaped support 11 for the tool 9, of the type known per se from U.S. Pat. No. 4,555,202. This tool 9 is clamped in the V-shaped groove 11 by means of a clamp 12, which is clamped with the bolt 13 on the top face 14 of the carrier 1 with the rear side 15 of the clamp 12 lying against the stop side 16 of the carrier. This clamp 12 has a nose 17 with inverted V-shaped groove which grips the tool 9 in the manner known from U.S. Pat. No. 4,555,202.

The side face 2 of the carrier 1, against which the support is fastened lies in a vertical plane which goes through the bottom edge 18 of the support 6.

The under side 19 of the carrier 1 is bevelled at 20, so that the carrier has not a single part which projects outside the circle 10, but always comes within it.

It can be seen clearly from looking at FIGS. 2 and 3 that on insertion in a bore the front face 21 no longer limits the insertion depth, as is the case with the known tool holder, but that insertion is possible over a great length which extends axially past the axial length of clamp and support.

For this, it is, of course, necessary that the side face 22 of the clamp 12 has a curve which is a continuation of the curve of the outside face 6 of the support.

FIG. 4 shows that on rotation of the workpiece clockwise, as indicated by the arrow 23, in contrast to rotation anticlockwise, as shown in FIG. 3, the same working can be carried out with one and the same carrier 1, in which the support 6' is fastened against the opposite side face 2' of the carrier 1 in the same way as shown in the other figures with the curve the opposite way, while the clamp is also designed in reverse.

I claim:

1. A tool post with tool for cutting metal from the inner surface of a cylindrical bore, comprising
   (a) a carrier having a top face and an outer side face,
   (b) a tool support and means for securing it to the outer side face of the carrier, the tool support having an outer side face that is curved inwardly on a radius no greater than the radius of a bore from which metal is to be cut,
   (c) a metal cutting tool,
   (d) a clamp on top of the support and secured to the top face of the carrier for clamping the tool upon the support with the cutting edge of the tool projecting longitudinally toward and laterally outward beyond the clamp and support and carrier,
   (e) the outer side face of the clamp being curved inwardly on a radius no greater than the radius of the bore from which metal is to be cut, and
   (f) the outer side faces of the tool support and clamp being disposed radially outward of the carrier and outside the means for securing the tool support to the outer face of the carrier.

2. The tool post with tool according to claim 1 wherein the inwardly curved outer side faces of the tool support and clamp are configured to be substantially concentric with the center of a bore from which metal is to be cut.

3. The tool post with tool according to claim 1 wherein the inwardly curved outer side face of the clamp is a continuation of the inwardly curved outer side face of the tool support.

* * * * *